US011973287B2

(12) United States Patent
Kitagawa et al.

(10) Patent No.: US 11,973,287 B2
(45) Date of Patent: Apr. 30, 2024

(54) BOARD MOUNTED CONNECTOR

(71) Applicant: Mitsubishi Electric Corporation, Tokyo (JP)

(72) Inventors: Shingo Kitagawa, Tokyo (JP); Mitsuo Sone, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 139 days.

(21) Appl. No.: 17/677,330

(22) Filed: Feb. 22, 2022

(65) Prior Publication Data

US 2022/0344846 A1 Oct. 27, 2022

(30) Foreign Application Priority Data

Apr. 21, 2021 (JP) ................................ 2021-071538

(51) Int. Cl.

| | |
|---|---|
| ***H01R 12/91*** | (2011.01) |
| ***H01R 12/58*** | (2011.01) |
| ***H01R 13/502*** | (2006.01) |
| ***H01R 13/631*** | (2006.01) |

(52) U.S. Cl.
CPC ............ *H01R 12/91* (2013.01); *H01R 12/58* (2013.01); *H01R 13/502* (2013.01); *H01R 13/6315* (2013.01)

(58) Field of Classification Search
CPC .. H01R 13/502; H01R 13/6315; H01R 12/88; H01R 12/89; H01R 12/58; H01R 12/714; H01R 12/91
See application file for complete search history.

(56) References Cited

U.S. PATENT DOCUMENTS 6,979,216 B2 * 12/2005 Maeda .................. H01R 12/88 439/260
7,258,561 B2 * 8/2007 Fukazawa ............. H01R 12/88 439/495
8,936,487 B2 * 1/2015 Takane .................. H01R 12/79 439/626
9,698,509 B2 * 7/2017 Ashibu ................. H01R 12/88
(Continued)

FOREIGN PATENT DOCUMENTS

CN 102761029 A * 10/2012 .......... H01R 12/592
JP H06176826 A * 6/1994
(Continued)

OTHER PUBLICATIONS

Notice of Reasons for Refusal dated Apr. 26, 2022 from the Japanese Patent Office in Japanese Application No. 2021-071538.

*Primary Examiner* — Marcus E Harcum
(74) *Attorney, Agent, or Firm* — Sughrue Mion, PLLC; Richard C. Turner

(57) ABSTRACT

To provide an inexpensive board mounted connector which achieves both a simplification in structure and a reduction in size.
A board mounted connector includes a fixed housing fixed to a board; connector terminals which are housed in the fixed housing and connected to a conductive portion of the board; an operating housing which is movable with respect to the fixed housing; and an elastically deformable support portion which presses, supports, and electrically connects relay terminals of electrical elements, which are inserted in the fixed housing, to the connector terminals along with the movement of the operating housing.

20 Claims, 12 Drawing Sheets

(56) References Cited

U.S. PATENT DOCUMENTS

| | | | | | |
|---|---|---|---|---|---|
| 9,972,928 | B1 * | 5/2018 | Kanzaki | H01R 12/7005 | |
| 10,193,260 | B1 * | 1/2019 | Suzuki | H01R 12/57 | |
| 11,381,018 | B2 * | 7/2022 | Manba | H01R 12/79 | |
| 2006/0110973 | A1 * | 5/2006 | Moritake | H01R 12/774 | 439/492 |
| 2007/0010127 | A1 * | 1/2007 | Takahira | H01R 12/88 | 439/495 |
| 2011/0021052 | A1 * | 1/2011 | Hirata | H01R 12/721 | 439/325 |
| 2012/0052707 | A1 * | 3/2012 | Lin | H01R 12/79 | 439/329 |
| 2012/0238118 | A1 * | 9/2012 | Yoshida | C25D 1/003 | 439/259 |
| 2013/0017702 | A1 * | 1/2013 | Kamiya | H01R 12/89 | 439/345 |
| 2015/0349461 | A1 * | 12/2015 | Arimai | H01R 13/6273 | 439/352 |
| 2018/0241155 | A1 | 8/2018 | Suzuki et al. | | |
| 2018/0323546 | A1 * | 11/2018 | Ikegami | H01R 13/641 | |
| 2019/0363491 | A1 * | 11/2019 | Suzuki | H01R 13/187 | |

FOREIGN PATENT DOCUMENTS

| | | | | |
|---|---|---|---|---|
| JP | 8-148204 | A | | 6/1996 |
| JP | 2001-176591 | A | | 6/2001 |
| JP | 2002-313502 | A | | 10/2002 |
| JP | 2006-260953 | A | | 9/2006 |
| JP | 2018-133309 | A | | 8/2018 |
| TW | 200818616 | A | * | 4/2008 |
| WO | WO-2020045065 | A1 | * | 3/2020 |

* cited by examiner

BOARD MOUNTED CONNECTOR

BACKGROUND OF THE INVENTION

Field of the Invention

The present application relates to the field of a board mounted connector.

Description of the Related Art

A floating connector has heretofore been known as a connector which connects circuit components to a wiring substrate (for example, refer to PTL 1). This type of connector includes a fixed housing fixed to a board; a movable housing in which to insert relay terminals (for example, signal terminals of electrical elements); and spring-like connector terminals which, being housed inside the movable housing, come into conductive contact with the relay terminals. This kind of heretofore known connector is such that the movable housing is pushed into the fixed housing, thereby bringing the relay terminals into contact conduction with contact portions of the connector terminals, wherein the connector terminals are formed to be spring-like, and thereby it is possible to absorb a mislocation and a board-housing assembly error which occur when mounting.

[PTL 1] JP-A-2018-133309

In the floating connector disclosed in PTL 1, however, in order to bring flexibility to it, the structure is complicated, increasing the number of parts, and a support spring portion required to be extended, so that the connector suffers from the disadvantage of growing in size as a whole. Also, it is required to adopt, as a spring member, a high-strength and high-conductivity material with springiness, such as a Corson alloy, leading to an increase in the cost of the connector.

On the other hand, when the flexibility is eliminated to control the product cost, the connector terminals and the relay terminals come into rigid contact with each other, so that it is required to increase the contact pressure between the terminals, and there are many restrictions on the board, meaning a decrease in assemblability. In contrast, when the contact pressure is decreased to improve assemblability, there is fear that the conductivity decreases due to micro sliding when vibrated. Also, when the flexibility is brought to the connector, the contact pressure is low, and the relay terminals cannot be regarded as a structure which supports the board, as a result of which it is required to increase the number of screws with which to fix the board. However, there are many restrictions on the board, and as a result, the number of parts increases, increasing the number of parts assembly man-hours and the production cost.

SUMMARY OF THE INVENTION

The present application has been made to solve the above problem, and an object of the present application is to provide an inexpensive board mounted connector which achieves both a simplification in structure and a reduction in size.

The board mounted connecter disclosed in the present application includes a fixed housing fixed to a board; connector terminals which are housed in the fixed housing and connected to a conductive portion the board; an operating housing which is movable with respect to the fixed housing; and an elastically deformable support portion which presses, supports, and electrically connects relay terminals of electrical elements, which are inserted in the fixed housing, to the connector terminals along with the movement of the operating housing.

According to the board mounted connector disclosed in the present application, it is possible to achieve both a simplification in structure and a reduction in size, and thus possible to obtain an inexpensive board mounted connector.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Hereinafter, a description will be given, based on the drawings, of the embodiments of the present application.

In the individual drawings, identical or equivalent members and portions are described bearing respective identical signs.

First Embodiment

Figure 1:
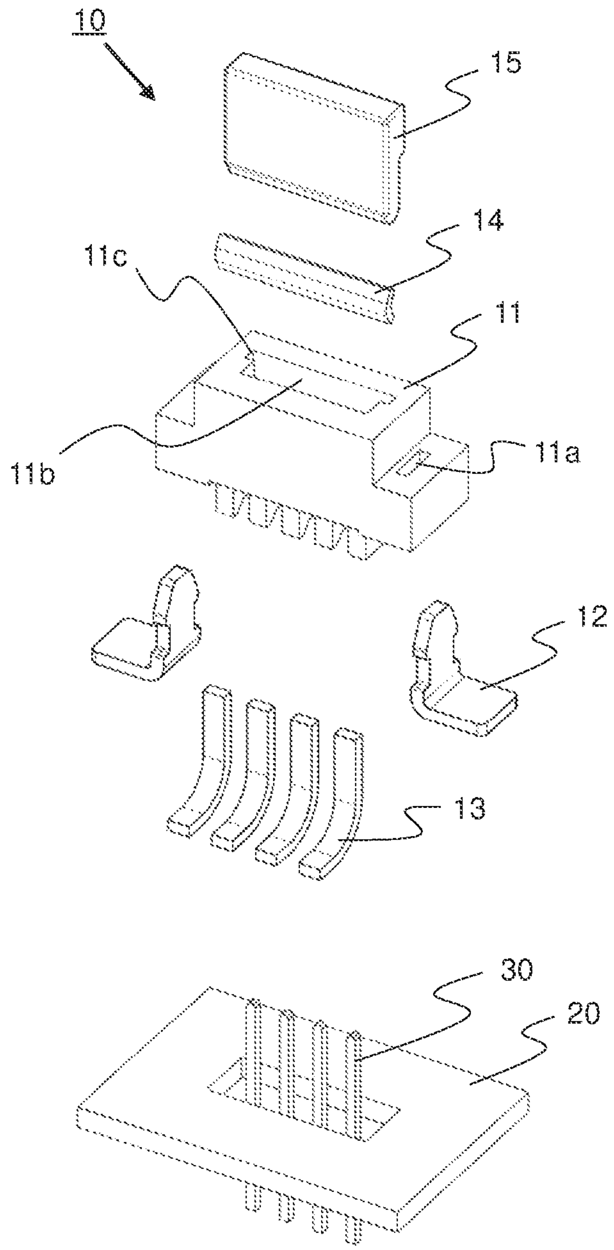
FIG. 1 is a developed perspective view showing the overall structure of a board mounted connector according to the first embodiment.
Figure 2:
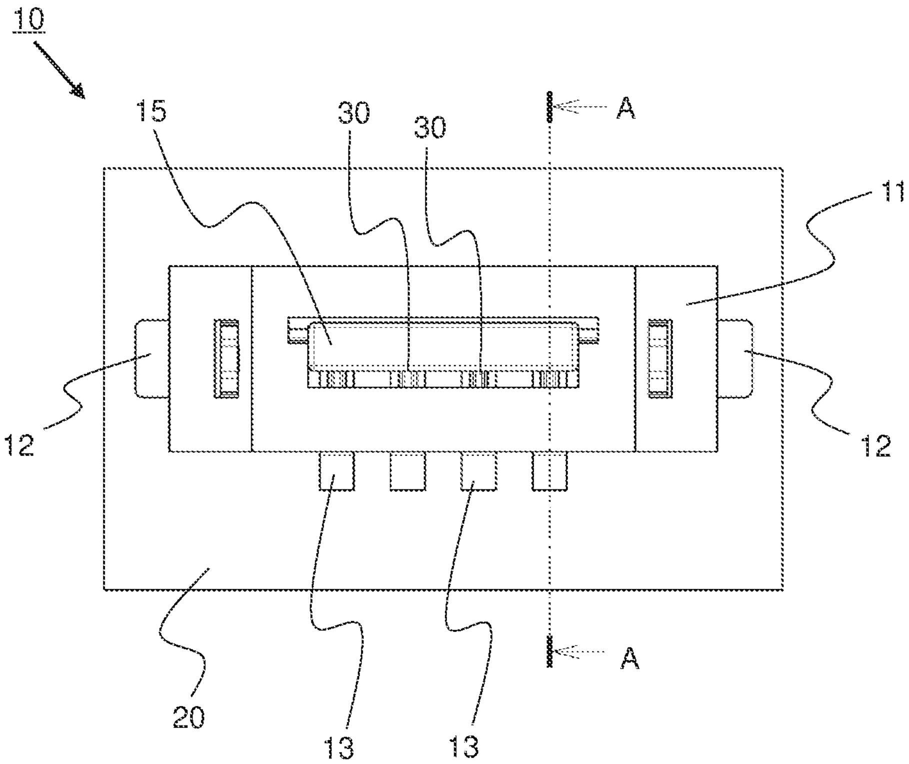
FIG. 2 is a top view showing the assembled state of the board mounted connector according to the first embodiment.
Figure 3:
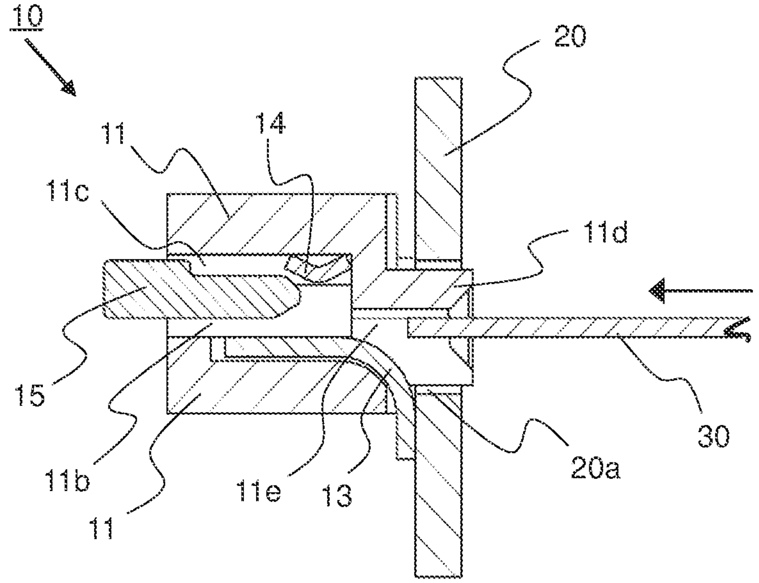
FIG. 3 is a sectional view along the line A-A showing the state before inserting relay terminals in the first embodiment.
Figure 4:
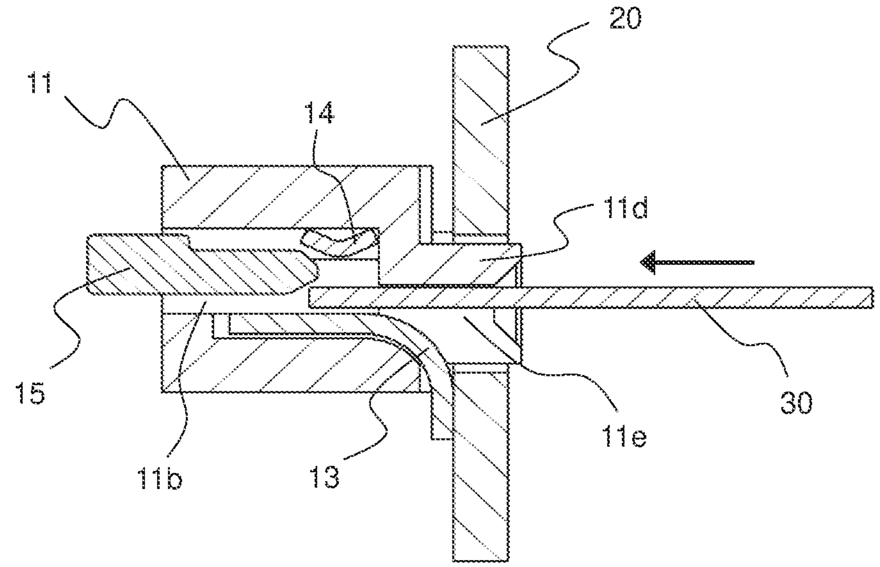
FIG. 4 is a sectional view showing the state when inserting the relay terminals in the first embodiment.
Figure 5:
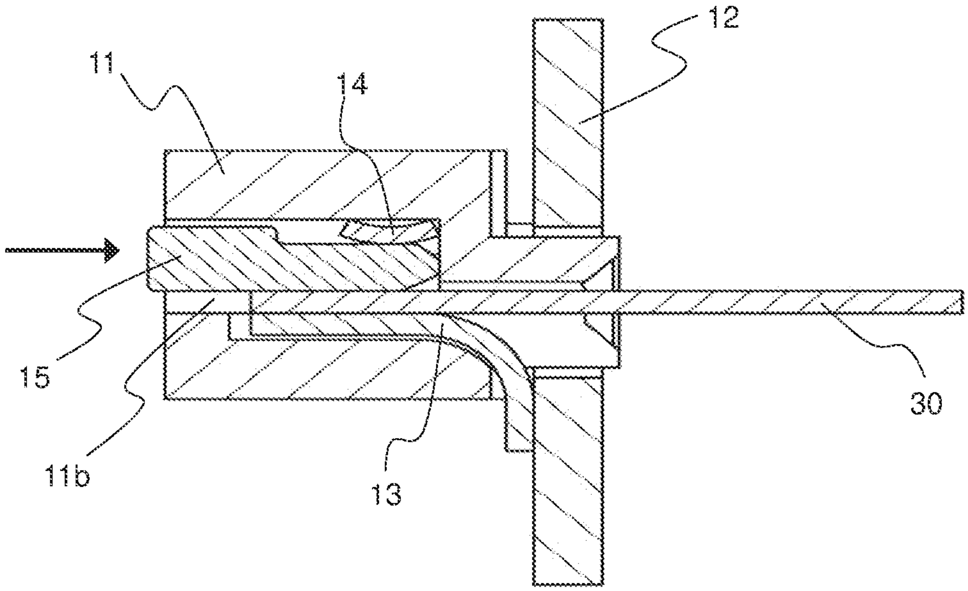
FIG. 5 is a sectional view showing the state when an operating housing is inserted in the first embodiment.

FIG. 1 is a developed perspective view showing the overall structure of a board mounted connector according to the first embodiment, FIG. 2 is a top view showing the assembled state of the board mounted connector according to the first embodiment, FIG. 3 is a sectional view along the line A-A in FIG. 2 showing the state before inserting relay terminals, FIG. 4 is a sectional view showing the state when inserting the relay terminals, and FIG. 5 is a sectional view showing the state when an operating housing is inserted.

In the drawings, a board mounted connector 10 is mounted on a board 20 having formed thereon a conductive pattern, and as well as holding therein a plurality of relay terminals 30, such as signal terminals of electrical elements, is electrically connected to the board 20.

The board mounted connector 10 is configured of a fixed housing 11 formed of a synthetic resin, a pair of fixing brackets 12 to be attached to the fixed housing 11, a plurality of L-shaped connector terminals 13, an elastically deformable support portion 14, and an operating housing 15 to be inserted in the fixed housing 11.

Herein, the fixed housing 11 has formed therein holes 11*a* in which to respectively fixedly support the pair of fixing brackets 12, a hole 11*b* in which to receive the operating housing 15, and grooves 11*c* which are provided along the hole 11*b* and in which to attach the deformable support portion 14, and as shown in FIG. 3, has formed therein a protruding portion 11*d* to be fitted in a rectangular through hole 20*a* of the board 20, and a hole 11*e* in which to receive the plurality of connector terminals 13 and relay terminals 30.

The hole 11*b* and the hole 11*e* are brought into communication with each other with a step therebetween in the fixed housing 11. Also, the deformable support portion 14, formed of an elastically deformable metal member, is inserted along the grooves 11*c* of the fixed housing 11, and the plurality of connector terminals 13 are also held inserted through a lower groove of the fixed housing 11.

To assemble this kind of board mounted connector 10, first, the plurality of connector terminals 13, the deformable support portion 14, and the fixing brackets 12 are attached to the fixed housing 11, after which the lower protruding portion 11*d* of the fixed housing 11 is inserted into the rectangular through hole 20*a* provided in the board 20, and the fixing brackets 12 attached to the fixed housing 11 are fixed soldered to a conductive portion of the board 20.

Next, one end of each of the plurality of connector terminals 13 is soldered to the conductive portion of the board 20, thus electrically connecting both the connector terminals and the conductive portion.

Next, as shown in FIG. 4, the plurality of relay terminals 30 are inserted into the hole 11*e* of the fixed housing 11 from the backside of the board 20 through a hole inside the lower protruding portion 11*d* of the fixed housing 11. At this time, a tapered surface is provided on a hole's opening portion of the protruding portion 11*d* of the fixed housing 11, and thereby the relay terminals 30 are guided even when inserted misaligned with the hole, thus correcting the direction of insertion, enabling the operation of insertion to be carried out with ease. Also, the inner diameter of the hole inside the protruding portion 11*d* is set to be larger than the outer diameter of the relay terminals 30, thereby preventing contact pressure from being applied on the relay terminals 30 when they are inserted, thus enabling an improvement in assemblability.

Next, as shown in FIG. 5, the operating housing 15 is inserted into the hole 11*b* of the fixed housing 11 and thus disposed between the deformable support portion 14 and the relay terminals 30. At this time, the deformable support portion 14 undergoes elastic deformation by being pressed by the sidewall of the operating housing 15, causing the deformable support portion 14 to generate a reaction force against the sidewall of the operating housing 15. Because of this, the operating housing 15, upon receiving the reaction force of the deformable support portion 14, presses the relay terminals 30 against the connector terminals 13, generating contact pressure in the contact portions between the relay terminals 30 and the connector terminals 13.

Thus, contact pressure is generated between the relay terminals 30 and the connector terminals 13 only by inserting the operating housing 15 into the hole 11*b* of the fixed housing 11, and also, the contact pressure between the terminals can be sufficiently secured by the reaction force of the deformable support portion 14, so that it is possible to prevent the terminals from slightly sliding even when they are vibrated and thus to maintain conductivity.

Herein, the operating housing 15, by having formed at the leading end portion thereof a tapered surface, is guided along the deformable support portion 14 and thus can be smoothly inserted into the hole 11*b*. Also, the leading end of the operating housing 15 abuts against the bottom of the hole 11*b* of the fixed housing 11 upon completion of the insertion, so that it does not happen that the operating housing 15 is inserted too far. Also, a plate-like elastic body can be used as the deformable support portion 14, so that the deformable support portion 14 can be formed in a small shape, enabling a reduction in the size of the whole of the board mounted connector 10. Furthermore, it is possible to adopt a metal member of inexpensive brass, iron, stainless, or the like, instead of a costly springy Corson alloy having high strength and high conductivity, and also to sufficiently secure the contact pressure between the terminals.

The deformable support portion 14 may be configured of an elastically deformable resin member which is used in a packing, or the like, as long as it can secure sufficient contact pressure.

Figure 6:
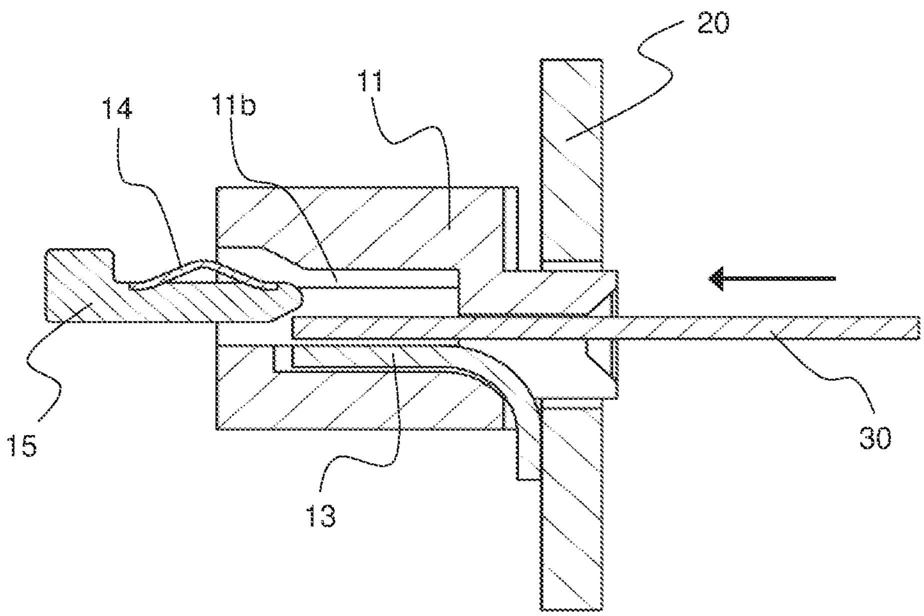
FIG. 6 is a sectional view showing a modification example according to the first embodiment.
Figure 7:
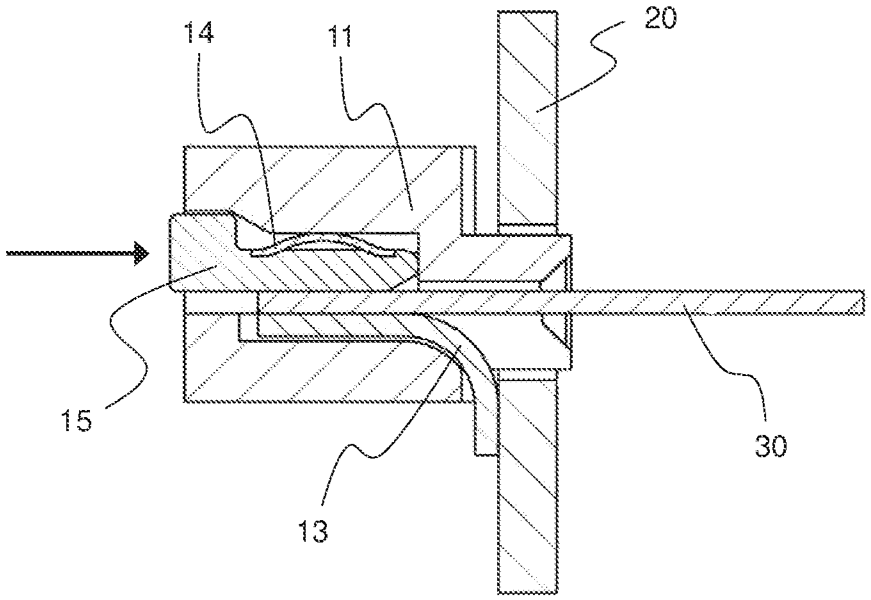
FIG. 7 is a sectional view describing an operation in the modification example according to the first embodiment.

In the heretofore described embodiment, the deformable support portion 14 is configured so as to be attached inserted in the grooves 11*c* of the fixed housing 11, but as shown in FIGS. 6 and 7 as a modification example, the same implementation is also possible when adopting a configuration wherein the deformable support portion 14 is attached to the operating housing 15 with a metal fixture (not shown).

Second Embodiment

Figure 8:
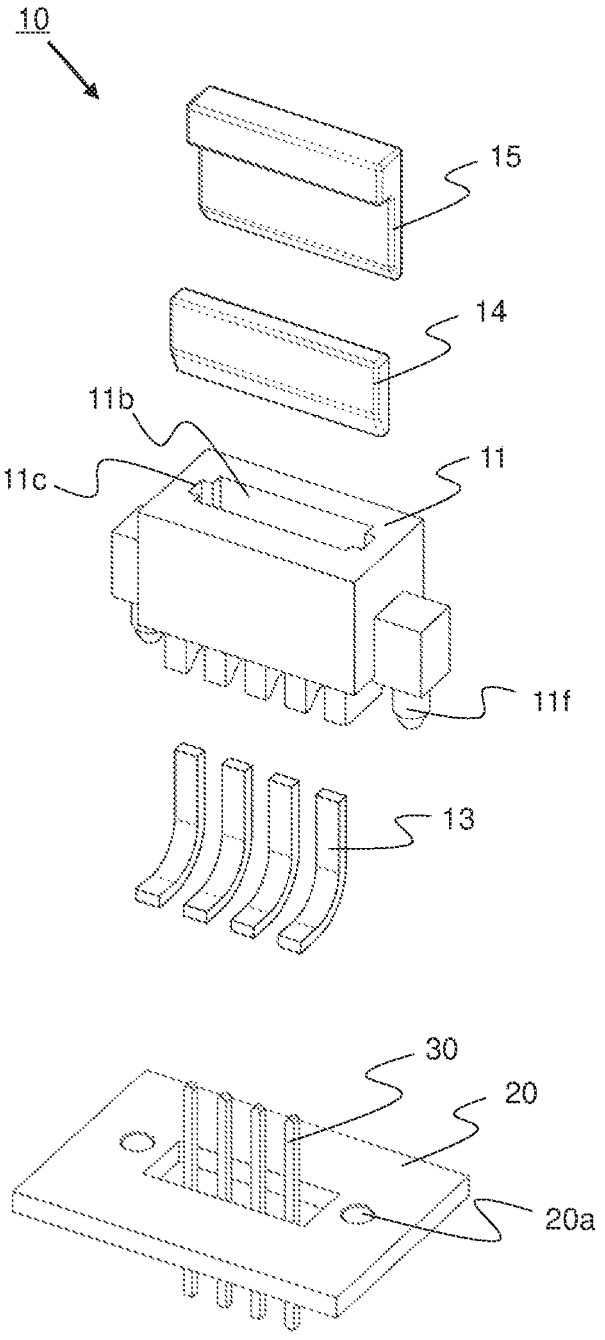
FIG. 8 is a developed perspective view showing the overall structure of a board mounted connector according to the second embodiment.
Figure 9:
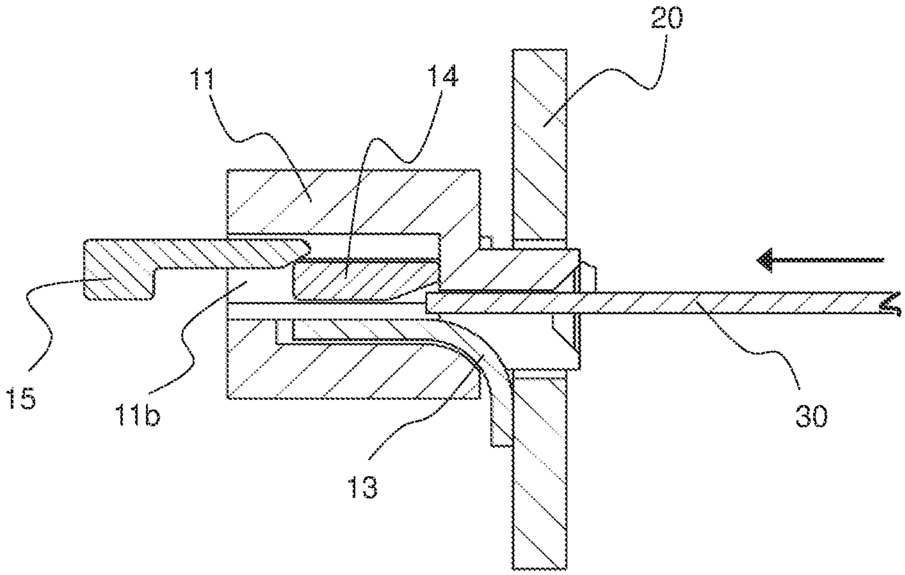
FIG. 9 is a sectional view showing the state when inserting relay terminals in the second embodiment.
Figure 10:
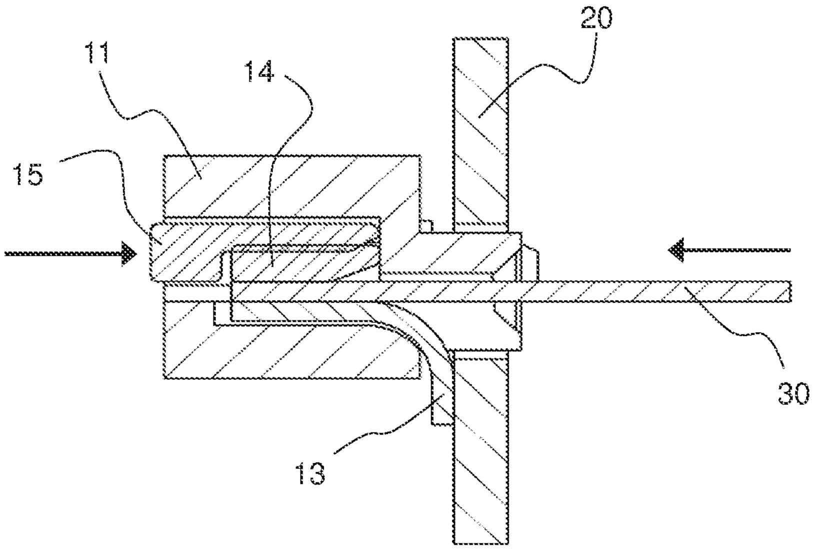
FIG. 10 is a sectional view showing the state when an operating housing is inserted in the second embodiment.

FIG. 8 is a developed perspective view showing the overall structure of a board mounted connector according to the second embodiment, FIG. 9 is a sectional view showing the state when inserting relay terminals in the second embodiment, and FIG. 10 is a sectional view showing the state when an operating housing is inserted in the second embodiment.

In the second embodiment, positioning pins 11*f* are provided on the fixed housing 11, and the fixed housing 11 is fixed to the board 20 by fitting the positioning pins 11*f* in respective through holes 20*a* of the board 20. Also, the deformable support portion 14 is configured of a resin substrate wherein an elastically deformable resin member is provided on at least a surface of the deformable support portion 14 opposite from the inner peripheral wall of the fixed housing 11, and a tapered surface is formed at the leading end portion of the deformable support portion 14.

The other components are the same as in the first embodiment, and so the description is omitted.

To assemble this kind of board mounted connector 10, first, the plurality of connector terminals 13 and the deformable support portion 14 are attached inserted in the fixed housing 11, the positioning pins 11*f* of the fixed housing 11 are fixed fitted in the through holes 20*a* provided in the board 20, and one end of each of the plurality of connector terminals 13 is soldered to the conductive portion of the board 20.

Next, the relay terminals 30 are inserted into the hole 11*b* of the fixed housing 11. At this time, the tapered surface is formed at the leading end of the deformable support portion 14, so that the relay terminals 30 are guided along the tapered surface even when misaligned, enabling the relay terminals 30 to be smoothly inserted into the fixed housing 11.

Next, the operating housing 15 is inserted into the hole 11*b* of the fixed housing 11, and as shown in FIG. 10, is press fitted between the inner wall of the fixed housing 11 and the deformable support portion. Because of this, the deformable support portion 14 is compressed, and the reaction force produced thereby causes the relay terminals 30 to press the portions of the connector terminals 13 in contact therewith with sufficient contact pressure, enabling an electrical connection to be carried out between both the terminals.

Herein, the operating housing 15, as it has tapered surface at the leading end thereof, is guided along the deformable support portion 14, and can be smoothly inserted into the hole 11*b*, in the same way as in the first embodiment. Also, the leading end portion of the operating housing 15 abuts against the bottom of the hole 11*b* upon completion of the insertion, so that the operating housing 15 can be prevented from being inserted too far.

Third Embodiment

Figure 11:
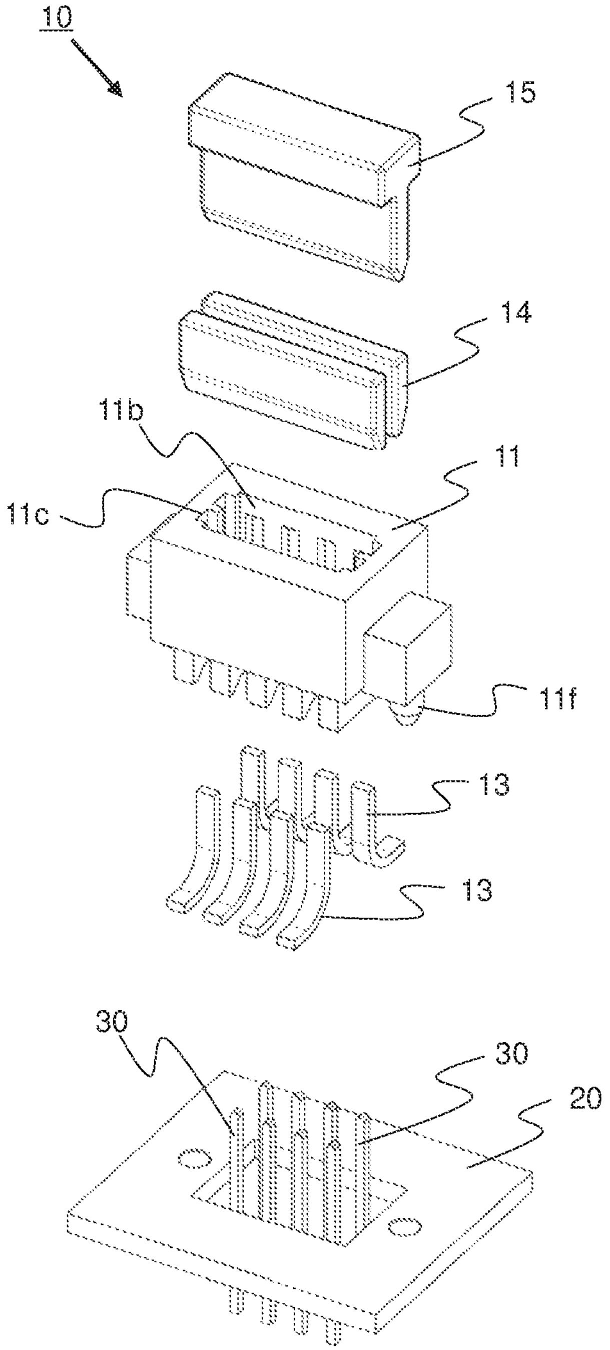
FIG. 11 is a developed perspective view showing the overall structure of a board mounted connector according to the third embodiment.
Figure 12:
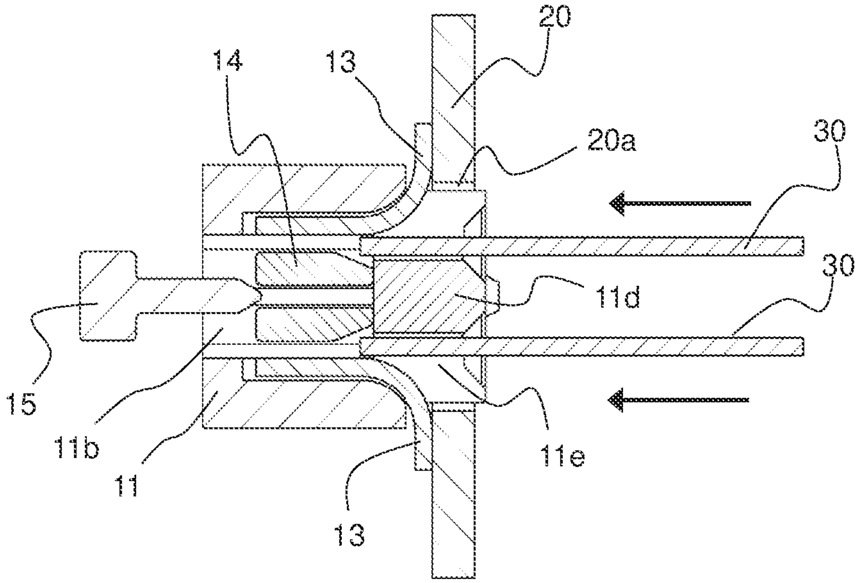
FIG. 12 is a sectional view showing the state when inserting relay terminals in the third embodiment.
Figure 13:
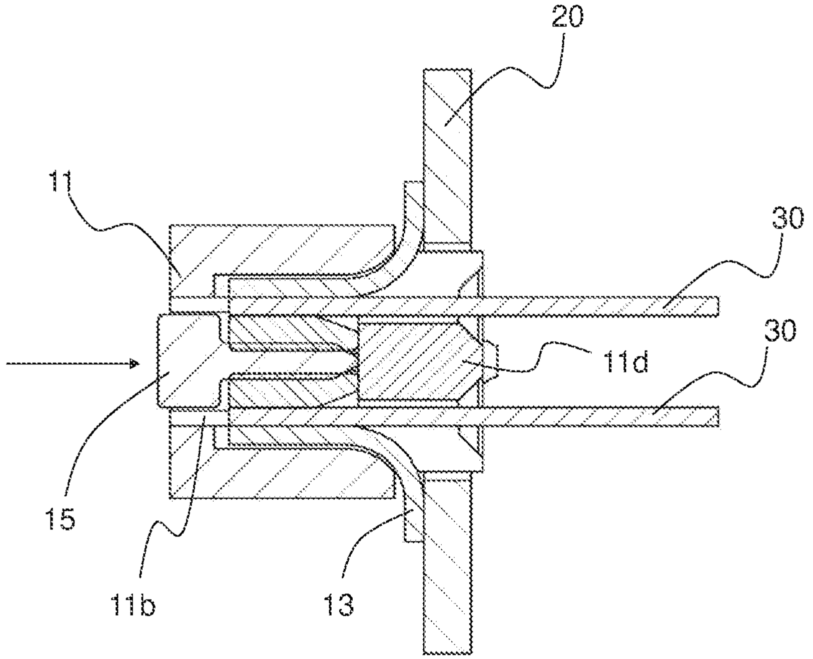
FIG. 13 is a sectional view showing the state when an operating housing is inserted in the third embodiment.

FIG. 11 is a developed perspective view showing the overall structure of a board mounted connector according to the third embodiment, FIG. 12 is a sectional view showing the state when inserting relay terminals in the third embodiment, and FIG. 13 is a sectional view showing the state when an operating housing is inserted in the third embodiment.

In the heretofore described second embodiment, a description has been given of the board mounted connector 10 wherein the plurality of relay terminals 30 are disposed in one row, but in the third embodiment, the board mounted connector 10 is configured when two rows of the plurality of relay terminals 30 are arranged in parallel.

In the drawings, two openings are provided one on each side of the protruding portion 11*d* of the fixed housing 11 which is inserted in the through hole 20*a* of the board 20, and also, the plurality of L-shaped connector terminals 13 are mounted, one row opposite each of the hole inner walls of the fixed housing 11. Also, two deformable support portions 14, the leading end of each of which has a tapered surface, are mounted in two respective pairs of grooves 11*c* of the fixed housing 11 so as to be opposite each other, and the two deformable support portions 14 are configured having therebetween a space into which is insertable the operating housing 15, the leading end of which has a tapered surface.

The other components are the same as in the second embodiment, and so the description is omitted.

With this kind of configuration, the two rows of relay terminals 30 are inserted into the hole 11*e* of the fixed housing 11 through the two respective openings of the fixed housing 11. At this time, a tapered surface is formed at the leading end of each of the deformable support portions 14, and thereby it is possible, when inserting the relay terminals 30, to absorb misalignment with the openings.

Next, when the operating housing 15 is inserted in the hole 11*b*, the two deformable support portions 14 are pressed apart in opposite directions, as shown in FIG. 13, thereby producing a reaction force on the deformable support portions 14. It means that the reaction force of the deformable support portions 14 causes the relay terminals 30 to press the connector terminals 13 with sufficient contact pressure, enabling electrical connection to be carried out between both the terminals.

Herein, the operating housing 15 in the third embodiment is such that each wall of its leading end in the direction of insertion has a tapered surface, so that in the same way as in the second embodiment, the operating housing 15 is guided in between the deformable support portions 14 by the tapered surfaces and thus can be smoothly inserted in between the two deformable support portions 14. Also, the leading end portion of the operating housing 15 abuts against the bottom of the hole 11*b* upon completion of the insertion, so that the operating housing 15 can be prevented from being inserted too far.

The same advantage can be obtained even when the two deformable support portions 14 is of a structure such that they have a U-shaped part wherein their leading ends are connected together to reduce the number of parts and that the U-shaped part deforms around the connection by inserting the operating housing 15 thereinto.

Figure 14:
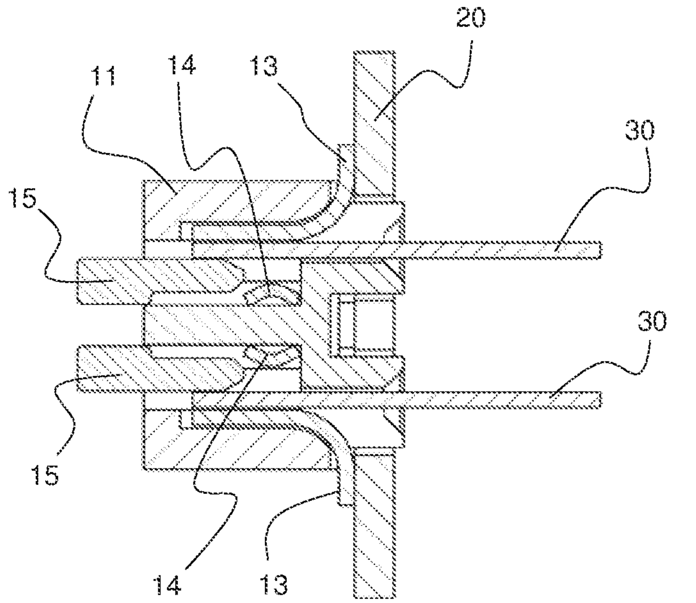
FIG. 14 is a sectional view showing a modification example according to the third embodiment.

Also, in the heretofore described third embodiment, an example is shown wherein the deformable support portions 14 are configured of a resin substrate having an elastically deformable resin, but as shown in FIG. 14 as a modification example, a configuration may be such that two plate-like springs are inserted one in each pair of opposing grooves 11*c* of the fixed housing 11.

Fourth Embodiment

Figure 15:
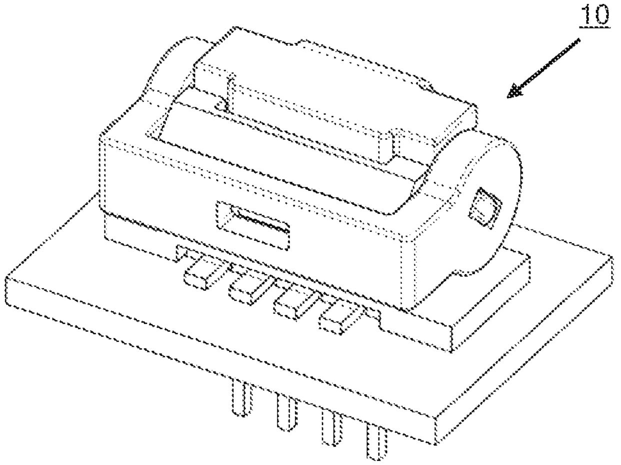
FIG. 15 is a perspective view showing the assembled state of a board mounted connector according to the fourth embodiment.
Figure 16:
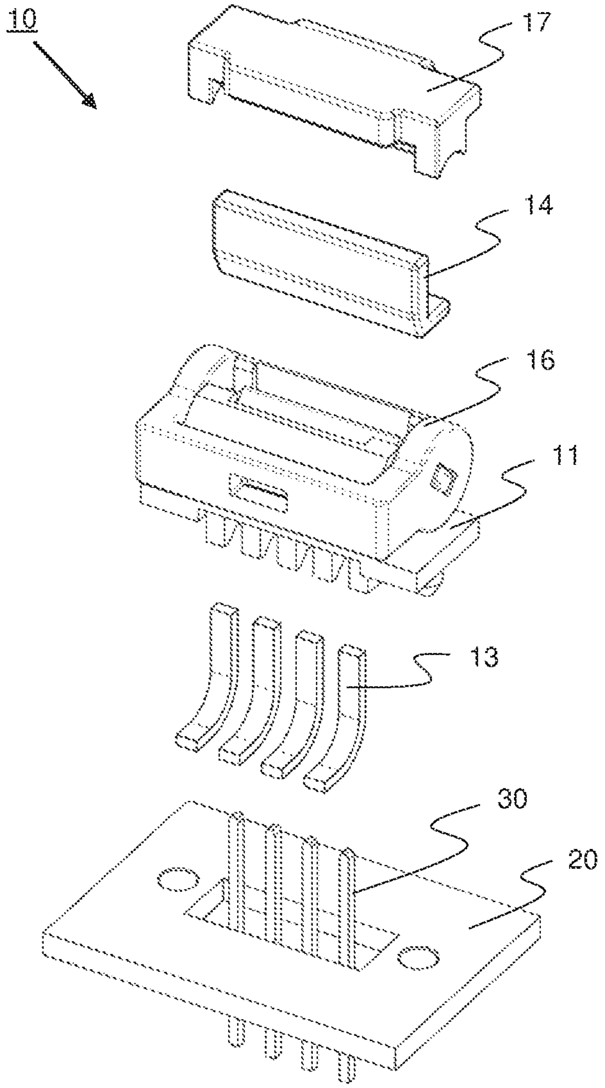
FIG. 16 is a developed perspective view showing the overall structure of the board mounted connector in the fourth embodiment.
Figure 17:
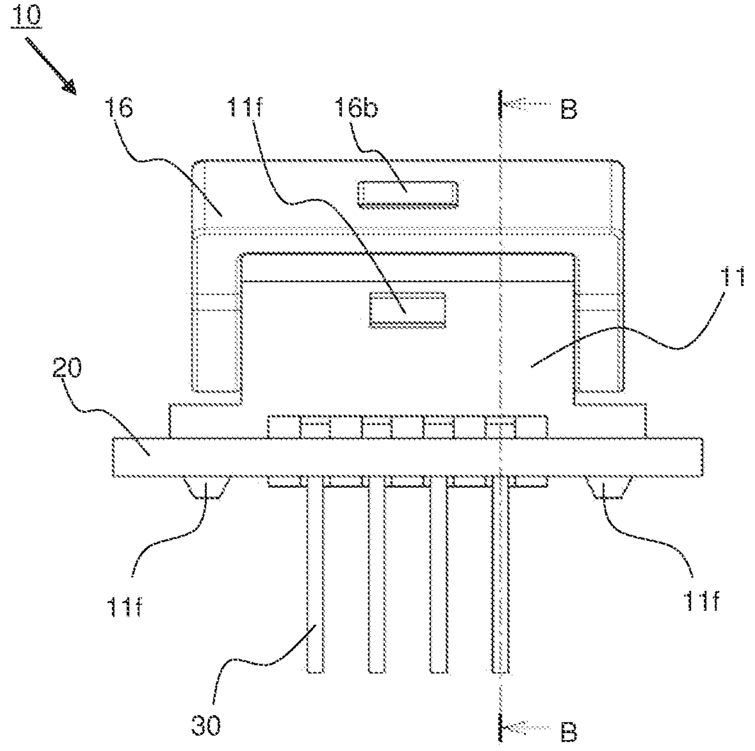
FIG. 17 is a front view of the board mounted connector according to the fourth embodiment.
Figure 18:
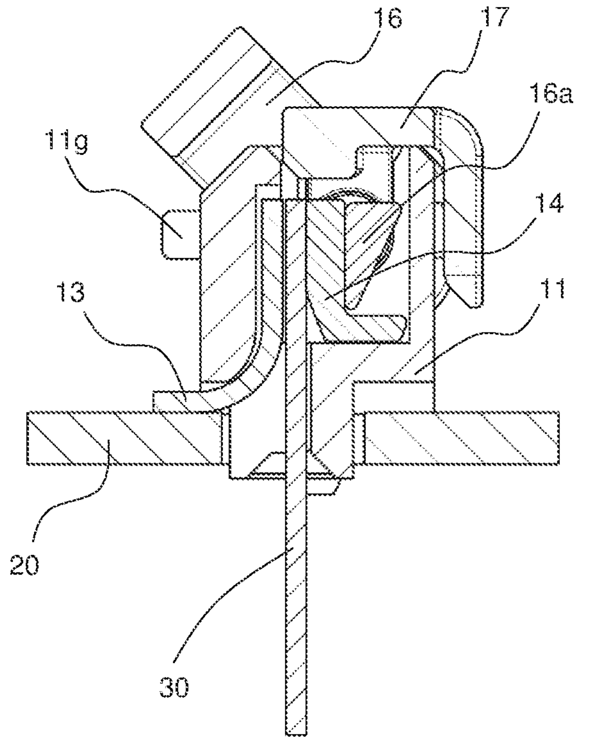
FIG. 18 is a sectional view along the line B-B showing the state before operating an operating housing in the fourth embodiment.
Figure 19:
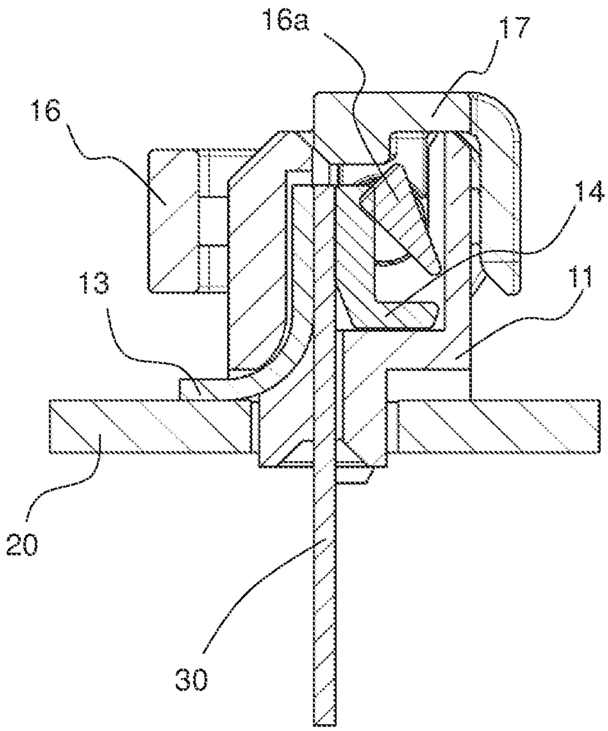
FIG. 19 is a sectional view showing the state after operating the operating housing in the fourth embodiment.

FIG. 15 is a perspective view showing the assembled state of a board mounted connector according to the fourth embodiment, FIG. 16 is a developed perspective view showing the overall structure of the board mounted connector in the fourth embodiment, FIG. 17 is front view of the board mounted connector according to the fourth embodiment, FIG. 18 is a sectional view along the line B-B showing the state before operating an operating housing in the fourth embodiment, and FIG. 19 is a sectional view showing the state after operating the operating housing in the fourth embodiment.

In the drawings, an operating housing 16, being pivotably attached to the fixed housing 11, has therein an integrally formed pivoting portion 16*a*. The pivoting portion 16*a* is inserted between the fixed housing 11 and the deformable support portion 14, at the time of which a configuration is such that the sidewall of the pivoting portion 16*a* is positioned parallel to the sidewall of the deformable support portion 14, as shown in FIG. 18.

Also, there is provided a covering 17 which covers the top of the fixed housing 11.

The other components are the same as in the second embodiment, and so the description is omitted.

With this kind of configuration, the fixed housing 11 is fixed to the board 20, and the connector terminals 13 are soldered to the conductive portion of the board 20. Next, the relay terminals 30 are inserted into the hole 11*b* of the fixed housing 11, after which the operating housing 16 is pivoted, causing a recessed portion 16*b* of the operating housing 16 to fit a raised portion 11*g* of the fixed housing 11. Along with this, the pivoting portion 16*a* pivots counterclockwise, pressing and elastically deforming the deformable support portion 14. This causes the relay terminals 30 to press the connector terminals 13, and the reaction force of the deformable support portion 14 can cause the connector terminals 13 and the relay terminals 30 to be electrically connected together with sufficient contact pressure.

The recessed portion 16*b* of the operating housing 16 is caused to fit the raised portion 11*g* of the fixed housing 11, so that it is possible to prevent the operating housing 16 from overpivoting.

Fifth Embodiment

Figure 20:
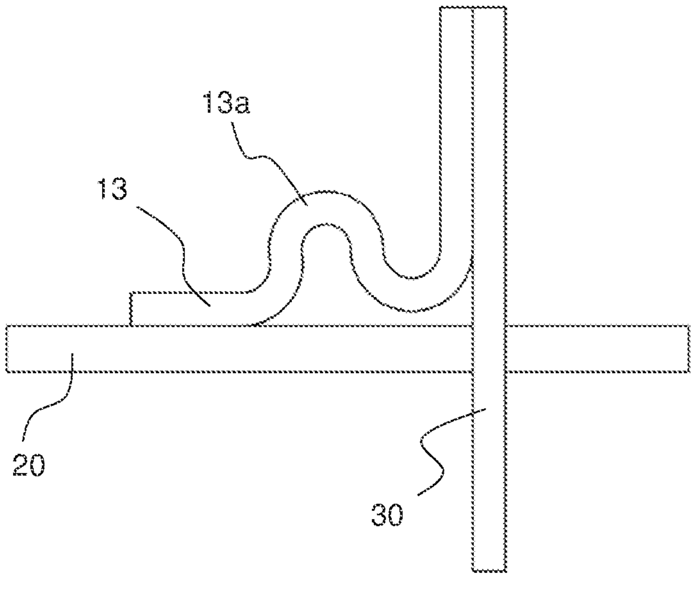
FIG. 20 is a side view showing the outline structure of connector terminals according to the fifth embodiment.

FIG. 20 is a side view showing the outline structure of connector terminals according to the fifth embodiment.

In the heretofore described first to fourth embodiments, the connector terminals 13 are formed in an L shape, but with the L-shaped connector terminals 13, when operating the operating housing 15, 16, the conductive portion of the board 20 bears the pressure force caused by the deformable support portion 14, which can damage the board 20. For this reason, in the fifth embodiment, as shown in FIG. 20, a kinked portion 13*a* is provided in the middle of each of the connector terminals 13, thereby producing the advantage that the kinked portion 13*a* absorb the load applied when pressed, enabling a reduction in the load on the board 20.

Although the present application is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A board mounted connector, comprising:

a board having a through hole;

a fixed housing fixed to the board and having a protruding portion which is inserted through the through hole of the board and protrudes from the board, the protruding portion having a tapered surface formed at a leading end opening portion;

connector terminals which are housed in the fixed housing and joined to a conductive portion of the board;

an operating housing which has a tapered surface at a leading end and is movable with respect to the fixed housing; and an elastically deformable support portion which, to the connector terminals, presses, supports, and electrically connects relay terminals of electrical elements, which are inserted along the protruding portion of the fixed housing, along with the movement of the operating housing.

2. The board mounted connector according to claim 1, wherein the operating housing is inserted into the fixed housing, and thereby the deformable support portion deforms elastically, electrically connecting the relay terminals to the connector terminals.

3. The board mounted connector according to claim 1, wherein the operating housing, by being inserted into the fixed housing, presses the relay terminals against the connector terminals.

4. The board mounted connector according to claim 2, wherein the operating housing, by being inserted into the fixed housing, presses the relay terminals against the connector terminals.

5. The board mounted connector according to claim 1, wherein the operating housing, by being inserted into the fixed housing, presses the deformable support portion against the relay terminals, electrically connecting the relay terminals to the connector terminals.

6. The board mounted connector according to claim 2, wherein the operating housing, by being inserted into the fixed housing, presses the deformable support portion against the relay terminals, electrically connecting the relay terminals to the connector terminals.

7. The board mounted connector according to claim 1, wherein the operating housing has a pivotable pivoting portion disposed in the fixed housing, and the pivoting portion, by being pivoted, presses the deformable support portion, electrically connecting the relay terminals to the connector terminals.

8. The board mounted connector according to claim 1, wherein two rows of the plurality of connector terminals are provided in the fixed housing, and also the deformable support portions are provided one on each side of the operating housing, or wherein two operating housings and two deformable support portions are provided, and the connector terminals disposed in two rows are electrically connected to the corresponding relay terminals disposed in two rows.

9. The board mounted connector according to claim 2, wherein two rows of the plurality of connector terminals are provided in the fixed housing, and also the deformable support portions are provided one on each side of the operating housing, or wherein two operating housings and two deformable support portions are provided, and the connector terminals disposed in two rows are electrically connected to the corresponding relay terminals disposed in two rows.

10. The board mounted connector according to claim 1, wherein the deformable support portion is attached to a sidewall of the operating housing which is parallel to the relay terminals.

11. The board mounted connector according to claim 2, wherein the deformable support portion is attached to a sidewall of the operating housing which is parallel to the relay terminals.

12. The board mounted connector according to claim 1, wherein the fixed housing has a tapered surface which protrudes downwardly of the board and guides the relay terminals.

13. The board mounted connector according to claim 1, wherein the operating housing has a tapered surface at a leading end portion thereof in the direction of insertion.

14. The board mounted connector according to claim 1, wherein the deformable support portion is configured of an elastically deformable metal member or an elastically deformable resin member.

15. The board mounted connector according to claim 2, wherein the deformable support portion is configured of an elastically deformable metal member or an elastically deformable resin member.

16. The board mounted connector according to claim 8, wherein the deformable support portion is configured of an elastically deformable metal member or an elastically deformable resin member.

17. The board mounted connector according to claim 1, wherein the connector terminals each have in the middle thereof a kinked portion.

18. The board mounted connector according to claim 2, wherein the connector terminals each have in the middle thereof a kinked portion.

19. The board mounted connector according to claim 8, wherein the connector terminals each have in the middle thereof a kinked portion.

20. A board mounted connector, comprising:

a fixed housing fixed to a board;

connector terminals which are housed in the fixed housing and connected to a conductive portion of the board;

an operating housing which is movable with respect to the fixed housing; and an elastically deformable support portion which presses, supports, and electrically connects relay terminals of electrical elements, which are inserted in the fixed housing, to the connector terminals along with the movement of the operating housing, wherein the operating housing is inserted into the hole of the fixed housing in a linear motion and thus disposed between the deformable support portion and the relay terminals, the fixed housing comprises a hole to receive the operating housing, and grooves provided along the hole for insertion of the deformable support portion, and the hole of the fixed housing is a passage along which the operating housing is configured to move so as to engage the deformable support portion and the relay terminals.

* * * * *